US012767422B2

(12) United States Patent
Brink et al.

(10) Patent No.: US 12,767,422 B2
(45) Date of Patent: Oct. 20, 2026

(54) CARTON WITH DISPENSER

(71) Applicant: Graphic Packaging International, LLC, Atlanta, GA (US)

(72) Inventors: Thomas Brink, Grand Rapids, MI (US); Scott Thomas Strand, Lindstrom, MN (US); Matthew R. Kearns, Woodstock, GA (US)

(73) Assignee: Graphic Packaging International, LLC, Atlanta, GA (US)

( * ) Notice: Subject to any disclaimer, the term of this patent is extended or adjusted under 35 U.S.C. 154(b) by 220 days.

(21) Appl. No.: 18/138,282

(22) Filed: Apr. 24, 2023

(65) Prior Publication Data

US 2023/0339670 A1 Oct. 26, 2023

Related U.S. Application Data

(60) Provisional application No. 63/334,220, filed on Apr. 25, 2022.

(51) Int. Cl.
*B65D 5/02* (2006.01)
*B31B 50/84* (2017.01)
(Continued)

(52) U.S. Cl.
CPC .......... *B65D 83/0805* (2013.01); *B31B 50/84* (2017.08); *B65D 5/0227* (2013.01); (Continued)

(58) Field of Classification Search
CPC ............................ B65D 83/0805; B31B 50/84
See application file for complete search history.

(56) References Cited

U.S. PATENT DOCUMENTS

| | | | |
|---|---|---|---|
| 978,569 | A | 12/1910 | Elkin |
| 1,651,848 | A | 12/1927 | Stevens |

(Continued)

FOREIGN PATENT DOCUMENTS

| | | |
|---|---|---|
| DE | 196 42 571 | 5/1997 |
| DE | 203 17 334 | 2/2004 |

(Continued)

OTHER PUBLICATIONS

International Search Report and Written Opinion for PCT/US2023/019562 dated Aug. 22, 2023.

*Primary Examiner* — Gene O Crawford
*Assistant Examiner* — Ayodeji H Ojofeitimi
(74) *Attorney, Agent, or Firm* — Andrew N. Claerbout; FisherBroyles, LLP

(57) ABSTRACT

A carton for holding and dispensing at least one article, the carton including a plurality of panels extending at least partially around an interior of the carton and including a top panel, a bottom panel, a front panel, and at least one back panel, a plurality of end flaps foldably connected to a respective panel of the plurality of panels and forming at least one closed end of the carton, and a dispenser for accessing the interior of the carton, the dispenser including a plurality of dispenser flaps at least partially separably connected to the top panel such that the dispenser is reconfigurable between a first configuration, in which the plurality of dispenser flaps is foldably connected to the top panel, and a second configuration, in which one or more of the dispenser flaps is separated from the top panel.

36 Claims, 5 Drawing Sheets

(51) Int. Cl.
*B65D 5/72* (2006.01)
*B65D 83/08* (2006.01)
*B31B 100/00* (2017.01)
*B31B 110/35* (2017.01)

(52) U.S. Cl.
CPC ...... *B65D 5/725* (2013.01); *B31B 2100/0024* (2017.08); *B31B 2110/35* (2017.08)

(56) References Cited

U.S. PATENT DOCUMENTS 1,667,376 A 4/1928 Fehrenkamp
1,824,862 A 9/1931 Young
D115,651 S 7/1939 Ford et al.
D120,673 S 5/1940 Jung
2,312,595 A 3/1943 Smith
2,348,378 A 5/1944 Goodyear
2,363,861 A 11/1944 Goodyear
2,565,146 A 8/1951 Okon
2,586,301 A 2/1952 Castle
2,737,326 A 3/1956 Toensmeier
2,764,284 A 9/1956 Arneson
2,794,585 A 6/1957 Wagner
2,950,041 A 8/1960 Stone
2,967,610 A 1/1961 Ebert et al.
3,013,710 A 12/1961 Kronson et al.
3,107,039 A 10/1963 Painter
3,239,097 A 3/1966 Bates
3,245,711 A 4/1966 Dantoin
3,257,027 A 6/1966 Weiss
3,493,261 A 2/1970 Stout et al.
3,612,266 A 10/1971 Graser
3,640,380 A 2/1972 Huffman
3,722,945 A 3/1973 Wood
3,767,041 A 10/1973 Graser
3,979,019 A 9/1976 Bliss
D242,901 S 1/1977 Lohrbach
4,007,869 A 2/1977 Stolkin et al.
4,008,849 A 2/1977 Baber
4,039,120 A 8/1977 Herzog
4,131,198 A 12/1978 Fischer
4,164,286 A 8/1979 Sutherland
4,188,766 A 2/1980 Culpepper
4,192,540 A 3/1980 Oliff
4,238,069 A 12/1980 Morris, Jr.
4,326,628 A 4/1982 Wood
4,336,898 A 6/1982 Joyce
4,397,393 A 8/1983 Pergande et al.
4,432,579 A 2/1984 Denmark et al.
4,438,843 A 3/1984 Graser
4,489,880 A 12/1984 Calvert
4,530,459 A 7/1985 Maroszek
4,566,591 A 1/1986 Turtschan et al.
4,601,390 A 7/1986 Rosenthal et al.
4,703,847 A 11/1987 Oliff
4,815,609 A 3/1989 Kiedaisch
4,993,625 A 2/1991 Stease et al.
D319,388 S 8/1991 McIntosh, Jr. et al.
5,135,104 A 8/1992 Jorba
5,188,225 A 2/1993 Jorba
5,219,421 A 6/1993 Tipping
5,299,734 A 4/1994 Lane
5,323,895 A 6/1994 Sutherland et al.
5,325,992 A 7/1994 Koller
5,351,815 A 10/1994 Fogle et al.
5,400,901 A 3/1995 Harrelson
5,402,931 A 4/1995 Gulliver et al.
5,407,065 A 4/1995 Sutherland
5,439,112 A 8/1995 De Guglielmo et al.
5,445,262 A 8/1995 Sutherland
5,484,059 A 1/1996 Sutherland
5,501,323 A 3/1996 Denesha
5,501,335 A 3/1996 Harris
5,503,267 A 4/1996 Sutherland
5,524,814 A 6/1996 Davis
D373,079 S 8/1996 Fahlen
5,542,598 A 8/1996 Capo
5,551,556 A 9/1996 Sutherland
5,582,345 A 12/1996 Lankhuijzen
5,588,586 A 12/1996 Negelen
5,595,291 A 1/1997 Negelen
5,598,920 A 2/1997 Hansen
5,620,094 A 4/1997 Naumann
5,638,956 A 6/1997 Sutherland
D386,680 S 11/1997 Johnson
5,687,838 A 11/1997 Bakx
5,704,483 A 1/1998 Groh
5,845,776 A 12/1998 Galbierz et al.
5,921,392 A 7/1999 Davis
5,950,912 A 9/1999 Economopoulos
5,957,289 A 9/1999 Negelen
5,960,945 A 10/1999 Sutherland
5,984,086 A 11/1999 Foushee et al.
6,021,897 A 2/2000 Sutherland
6,223,892 B1 5/2001 Bakx
6,315,111 B1 11/2001 Sutherland
6,439,452 B1 8/2002 Tsao
6,488,322 B2 12/2002 Bakx
6,530,516 B1 3/2003 Ritter
6,550,639 B2 4/2003 Brown
6,615,984 B2 9/2003 Saulas et al.
6,817,484 B2 11/2004 Morin et al.
6,866,189 B2 3/2005 Nelson
7,000,803 B2 * 2/2006 Miller .................... B65D 71/36
221/302
D525,866 S 8/2006 Oliveira
7,083,046 B2 8/2006 Bakx
D532,690 S 11/2006 Oliveira
7,134,572 B2 * 11/2006 Morin ................ B65D 83/0805
221/33
7,159,760 B2 1/2007 Pluck et al.
7,264,114 B2 9/2007 Daniel
7,617,969 B2 11/2009 Oliveira
7,621,439 B2 11/2009 McClure
7,762,450 B2 7/2010 Oliveira
7,793,821 B2 9/2010 Oliveira
7,803,726 B2 9/2010 Policicchio et al.
7,874,477 B2 * 1/2011 Sutherland ............ B65D 71/36
206/427
8,162,135 B2 4/2012 Oliveira
8,225,985 B2 7/2012 Oliveira
D675,514 S 2/2013 Baker
8,646,653 B2 2/2014 Lien et al.
8,978,889 B2 3/2015 Fitzwater et al.
9,096,344 B1 * 8/2015 Block ...................... B65D 5/72
9,139,355 B2 9/2015 Yao
9,487,340 B2 11/2016 Castela
9,533,822 B2 1/2017 Policicchio
9,598,202 B2 3/2017 Oliveira et al.
9,630,736 B2 4/2017 Oliveira
9,840,358 B2 12/2017 Oliveira
10,610,078 B2 4/2020 Oliveira
2002/0108962 A1 8/2002 Mangin
2002/0113449 A1 8/2002 Bakx
2003/0106926 A1 6/2003 Beatificato et al.
2003/0155263 A1 8/2003 Morin
2003/0155264 A1 8/2003 Morin
2003/0213705 A1 11/2003 Woog
2004/0026440 A1 2/2004 Kruchoski et al.
2004/0079666 A1 4/2004 Bakx
2004/0089656 A1 5/2004 Watkins
2004/0178210 A1 * 9/2004 McDonald ............... B65D 5/62
221/63
2004/0200854 A1 10/2004 Brickwood
2004/0226833 A1 11/2004 Daniel
2006/0049067 A1 3/2006 McDonald
2006/0091190 A1 5/2006 Nikolai
2007/0000794 A1 1/2007 Requena
2008/0202946 A1 8/2008 Jego
2010/0307932 A1 12/2010 Mezzini

(56) References Cited

U.S. PATENT DOCUMENTS

| | | | |
|---|---|---|---|
| 2019/0127111 A1 | 5/2019 | Kearns | |
| 2023/0242328 A1 | 8/2023 | Weaver | |

FOREIGN PATENT DOCUMENTS

| | | | |
|---|---|---|---|
| DE | 20 2004 004 248 | | 8/2004 |
| DE | 20 2004 017 954 | | 2/2005 |
| EP | 0 048 506 | | 3/1982 |
| EP | 0 285 043 | | 10/1988 |
| EP | 0 398 835 | | 11/1990 |
| EP | 0 495 197 | | 7/1992 |
| EP | 0 541 334 | | 5/1993 |
| EP | 0 639 504 | | 2/1995 |
| EP | 0 780 320 | | 6/1996 |
| EP | 1 070 671 | | 1/2001 |
| EP | 1 384 679 | | 1/2004 |
| EP | 1 661 813 | | 5/2006 |
| FR | 1 582 235 | | 9/1969 |
| FR | 2 525 992 | | 11/1983 |
| FR | 2 664 239 | | 1/1992 |
| FR | 2 731 413 | | 9/1996 |
| GB | 889 718 | | 2/1962 |
| GB | 1 342 180 | | 12/1973 |
| GB | 2 085 391 | | 4/1982 |
| GB | 2 158 037 | | 11/1985 |
| JP | 10-167352 | A | 6/1998 |
| JP | 2000-281155 | A | 10/2000 |
| JP | 2004524234 | | 12/2004 |
| JP | 2018-202211 | A | 12/2018 |
| KR | 10-0472517 | B1 | 6/2005 |
| KR | 2011-0009466 | U | 10/2011 |
| SE | 140 388 | | 5/1953 |
| WO | WO 91/05448 | | 4/1991 |
| WO | WO 97/33807 | | 9/1997 |
| WO | WO 98/49071 | | 11/1998 |
| WO | WO 99/01356 | | 1/1999 |
| WO | WO 02/40374 | | 5/2002 |
| WO | WO 02/059011 | | 8/2002 |
| WO | WO 02/062676 | | 8/2002 |
| WO | WO 02/079048 | | 10/2002 |
| WO | WO 03/016167 | | 2/2003 |
| WO | WO 2005/085091 | | 9/2005 |
| WO | WO 2005/095222 | | 10/2005 |
| WO | WO 2006/044583 | | 4/2006 |
| WO | WO 2006/108098 | | 10/2006 |
| WO | WO 2007/044525 | | 4/2007 |

* cited by examiner

CARTON WITH DISPENSER

CROSS-REFERENCE TO RELATED APPLICATION

This application claims the benefit of U.S. Provisional Patent Application No. 63/334,220, filed on Apr. 25, 2022.

INCORPORATION BY REFERENCE

The disclosure of U.S. Provisional Patent Application No. 63/334,220, filed on Apr. 25, 2022, is hereby incorporated by reference for all purposes as if set forth in its entirety.

BACKGROUND

The present disclosure generally relates to cartons for holding and dispensing articles.

SUMMARY

According to one aspect, the disclosure is generally directed to a carton for holding and dispensing at least one article, the carton comprising a plurality of panels extending at least partially around an interior of the carton and comprising a top panel, a bottom panel, a front panel, and at least one back panel, a plurality of end flaps foldably connected to a respective panel of the plurality of panels and forming at least one closed end of the carton, and a dispenser for accessing the interior of the carton, the dispenser comprising a plurality of dispenser flaps at least partially separably connected to the top panel such that the dispenser is reconfigurable between a first configuration, in which the plurality of dispenser flaps is foldably connected to the top panel, and a second configuration, in which one or more of the dispenser flaps is separated from the top panel.

According to another aspect, the disclosure is generally directed to a blank for forming a carton for holding and dispensing at least one article, the blank comprising a plurality of panels for extending at least partially around an interior of the carton formed from the blank and comprising a top panel, a bottom panel, a front panel, and at least one back panel, a plurality of end flaps foldably connected to a respective panel of the plurality of panels for forming at least one closed end of the carton formed from the blank, and a dispenser for accessing the interior of the carton formed from the blank, the dispenser comprising a plurality of dispenser flaps at least partially separably connected to the top panel such that the dispenser is reconfigurable between a first configuration, in which the plurality of dispenser flaps is foldably connected to the top panel, and a second configuration, in which one or more of the dispenser flaps is separated from the top panel.

According to another aspect, the disclosure is generally directed to a method of forming a carton for holding and dispensing at least one article, the method comprising obtaining a blank, the blank comprising a plurality of panels comprising a top panel, a bottom panel, a front panel, and at least one back panel, the blank further comprising a plurality of end flaps foldably connected to a respective panel of the plurality of panels, the blank further comprising a dispenser comprising a plurality of dispenser flaps at least partially separably connected to the top panel. The method further comprises positioning the plurality of panels extending at least partially around an interior of the carton and such that the dispenser is reconfigurable between a first configuration, in which the plurality of dispenser flaps is foldably connected to the top panel, and a second configuration, in which one or more of the dispenser flaps is separated from the top panel, and overlapping the plurality of end flaps to form at least one closed end of the carton.

Those skilled in the art will appreciate the above-stated advantages and other advantages and benefits of various additional embodiments reading the following detailed description of the embodiments with reference to the below-listed drawing figures.

BRIEF DESCRIPTION OF THE DRAWINGS

According to common practice, the various features of the drawings discussed below are not necessarily drawn to scale. Dimensions of various features and elements in the drawings may be expanded or reduced to more clearly illustrate the embodiments of the disclosure.

Corresponding parts are designated by corresponding reference numbers throughout the drawings.

DETAILED DESCRIPTION

Cartons according to the present disclosure can accommodate articles of numerous different shapes. For the purpose of illustration and not for the purpose of limiting the scope of the disclosure, the following detailed description describes articles such as gloves (e.g., nitrile, latex, rubber, other polymeric materials, or gloves formed from other materials), tissues, sheets or barriers, wipes, cloths, or other household/medical/industrial products for being sequentially dispensed from such cartons. It will be understood that the articles can be different products, such as paper towels, napkins, sanitary or disinfecting wipes, etc., without departing from the disclosure.

In this specification, the terms "lower," "bottom," "upper," and "top" indicate orientations determined in relation to fully erected and upright cartons. As described herein, cartons can be formed from blanks by overlapping multiple panels, portions, and/or end flaps. Such panels, portions and/or end flaps may be designated herein in terms relative to one another, e.g., "first", "second", "third", etc., in sequential or non-sequential reference, without departing from the disclosure.

Figure 1:
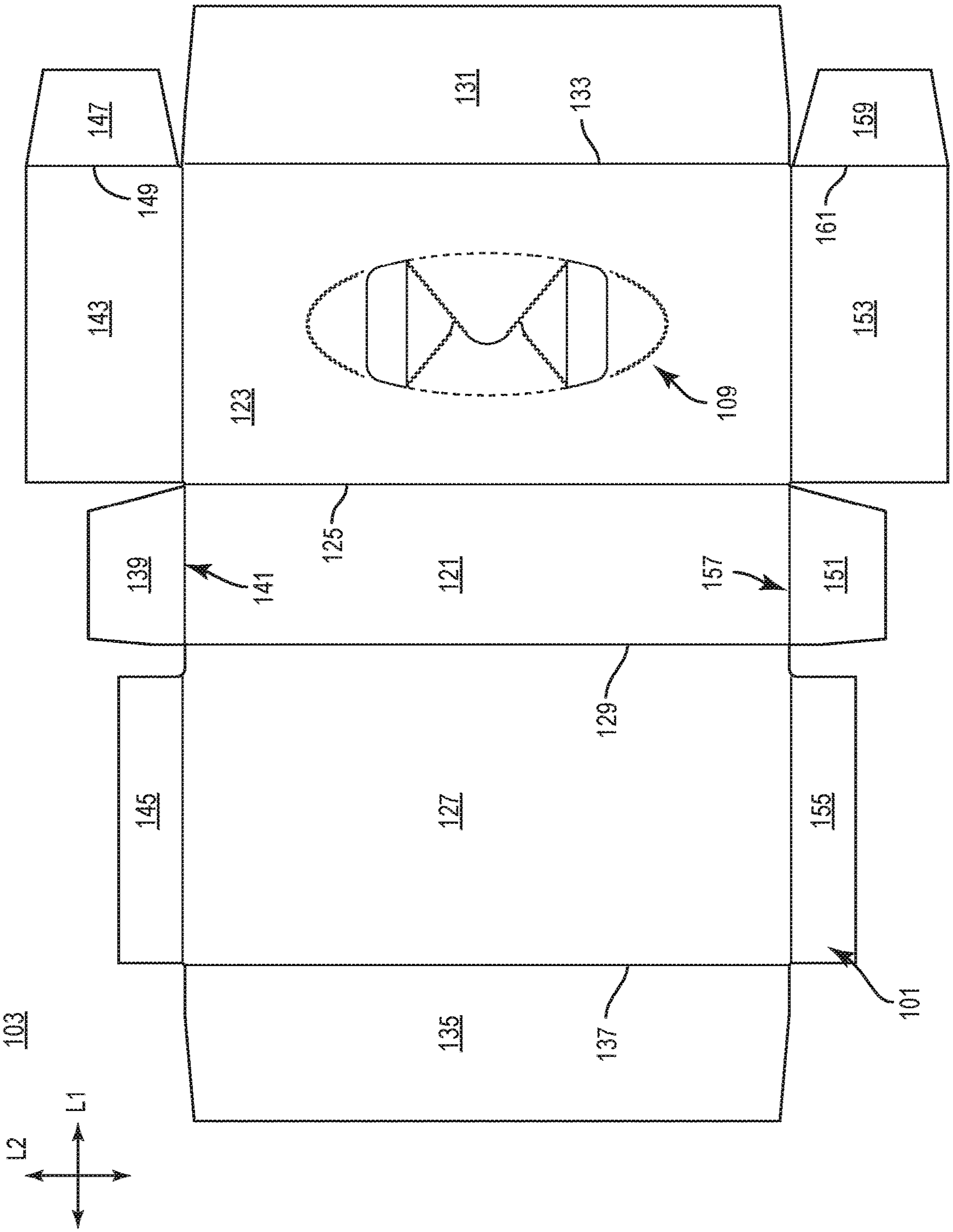
FIG. 1 is a plan view of an exterior surface of a blank used to form a carton according to an exemplary embodiment of the disclosure.

FIG. 1 is a plan view of an exterior surface 101 of a blank, generally indicated at 103, used to form a container or carton 105 (FIG. 2) according to an exemplary embodiment of the disclosure. As described further herein, the carton 105 can be provided with a dispenser 109 for accessing an interior 107 of the carton 105 and dispensing one or more articles held in the interior 107 of the carton 105. The dispenser 109 can be formed of materials that have enhanced sustainability comparable to other materials. For example, in some embodiments, the dispenser 109 can be comprised of paperboard. In some embodiments, the dispenser 109 can be devoid of polymeric materials such as plastic, e.g., plastic films.

As shown in FIG. 1, the blank 103 can have a longitudinal axis L1 and a lateral axis L2, and a plurality of panels for extending at least partially around the interior 107 of the carton 105 formed from the blank 103. In the illustrated embodiment, the plurality of panels of the carton blank 103 can include a front side panel or front panel 121, a top side panel or top panel 123 foldably connected to the front panel 121 at a lateral fold line 125, and a bottom panel 127 foldably connected to the front panel 121 at a lateral fold line 129. A first back panel 131 can be foldably connected to the top panel 123 at a lateral fold line 133, and a second back panel 135 can be foldably connected to the bottom panel 127 at a lateral fold line 137. It will be understood that one or both of the back panels 131, 135 can be considered an end flap foldably connected to a respective panel of the plurality of panels.

The blank 103 can also include a plurality of end flaps for forming at least one closed end of the carton 105. The end flaps can include a first front side end flap 139 foldably connected to the front panel 121 at a respective portion of a longitudinal fold line 141, a first top side end flap 143 foldably connected to the top panel 123 at a respective portion of the longitudinal fold line 141, and a first bottom side end flap 145 foldably connected to the bottom panel 127 at a respective portion of the longitudinal fold line 141.

As also shown, an attachment end flap 147 can be foldably connected to the end flap 143 at a lateral fold line 149. The end flaps 139, 143, 145, 147 can be a first plurality of end flaps extending along a first marginal portion of the blank for being at least partially overlapped to form a first closed end 111 of the carton 105 formed from the blank 103. In some embodiments, the end flaps 147, 143 can be considered foldably connected portions of a single end flap, e.g., a base portion and a distal portion of such end flap. In some embodiments, the fold line 149 can be collinear with or form a portion of the fold line 133.

Similarly, a second front side end flap 151, a second top side end flap 153, and a second bottom side end flap 155 can be foldably connected to opposite ends of the respective panels 121, 123, 127 at respective portions of a longitudinal fold line 157. An attachment end flap 159 can also be foldably connected to the end flap 153 at a lateral fold line 161. The end flaps 151, 153, 155, 159 can be a second plurality of end flaps extending along a second marginal portion of the blank 103 and for being at least partially overlapped to form a second closed end 113 of the carton 105 formed from the blank 103. In some embodiments, the end flaps 153, 159 can be considered foldably connected portions of a single end flap, e.g., a base portion and a distal portion of such end flap. In some embodiments, the fold line 161 can be collinear with or form a portion of the fold line 133.

The blank 103 also includes dispenser features for forming the dispenser 109 of the carton 105. With additional reference to FIG. 1A, such dispenser features can include a first dispenser flap 163, a second dispenser flap 165 (broadly, "third dispenser flap"), a third dispenser flap 167 (broadly, "second dispenser flap"), and a fourth dispenser flap 169, each in at least partial facing relation with one another.

In the illustrated embodiment, the first dispenser flap 163 can be at least partially separably connected to the top panel 123 at a curved tear line 171, the second dispenser flap 165 can be at least partially separably connected to the top panel 123 at a curved tear line 173, the third dispenser flap 167 can be foldably connected to a first dispenser panel 175 at a longitudinal fold line 177, and the fourth dispenser flap 169 can be foldably connected to a second dispenser panel 179 at a longitudinal fold line 181.

Each dispenser panel 175, 179 can be at least partially separably connected to the top panel 123 at a respective curved tear line 183, 185. As shown, and as described further herein, the third dispenser flap 163 can be at least partially separable from the top panel 123 at a respective pair of at least partially curved cuts 187, 189 that intersect or extend adjacent endpoints of the fold line 177, and the fourth dispenser flap 169 can be at least partially separable from the top panel 123 at a respective pair of at least partially curved cuts 191, 193 that intersect or extend adjacent endpoints of the fold line 181.

Figure 1A:
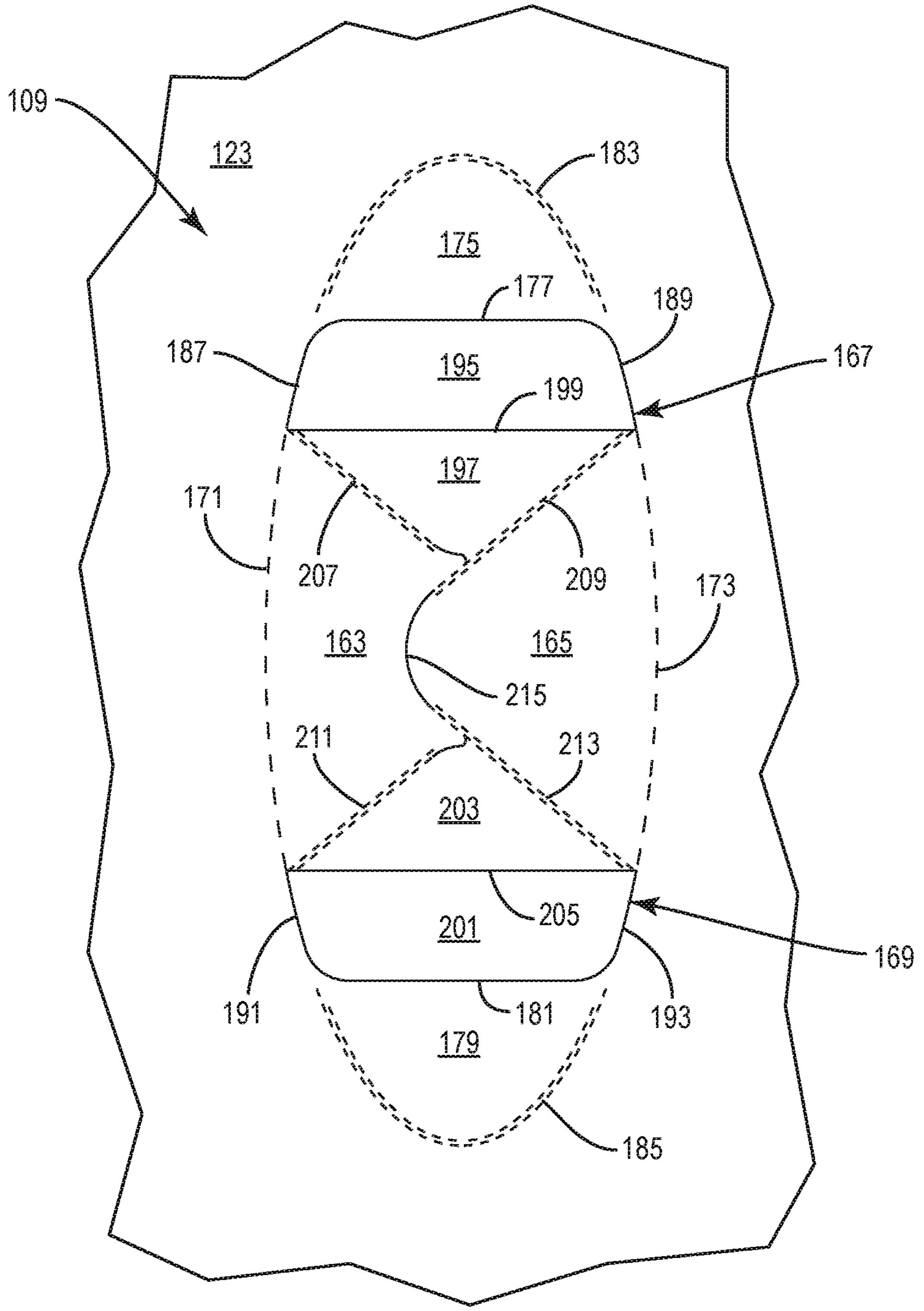
FIG. 1A is an enlarged view of a portion of the blank of FIG. 1.

With continued reference to FIG. 1A, the dispenser features 109 can be arranged such that endpoints of the tear line 183 are positioned proximate or intersecting endpoints of the respective cuts 187, 189, the other endpoints of the respective cuts 187, 189 are positioned proximate or intersecting endpoints of the respective tear lines 171, 173, the other endpoints of the respective tear lines 171, 173 are positioned proximate or intersecting endpoints of the respective cuts 191, 193, and the other endpoints of the respective cuts 191, 193 are positioned proximate or intersecting endpoints of the tear line 185. Such arrangement of the lines of weakening 171, 173, 183, 185, 187, 189, 191, 193 can form a generally elliptical line of weakening around the dispenser features to facilitate removal thereof, as described further herein. It will be understood that the lines of weakening associated with the dispenser features can form a different arrangement, e.g., circular, square, trapezoidal, etc., without departing from the disclosure.

In the illustrated embodiment, the third dispenser flap 167 can include a base portion 195 foldably connected to the dispenser panel 175 at the longitudinal fold line 177, and a distal portion 197 foldably connected to the base portion 195 at a longitudinal fold line 199. Similarly, the fourth dispenser flap 169 can include a base portion 201 foldably connected to the dispenser panel 179 at the longitudinal fold line 181 and a distal portion 203 foldably connected to the base portion 201 at a longitudinal fold line 205.

The dispenser flaps 163, 165, 167, 169 can be arranged such that the distal portion 197 of the dispenser flap 167 can be at least partially separable from the dispenser flaps 163, 165 at respective oblique tear lines 207, 209 that intersect each other and respective endpoints of the longitudinal fold line 199. The base portion 203 of the dispenser flap 169 can likewise be at least partially separable from the respective dispenser flaps 163, 165 at respective oblique tear lines 211, 213 that intersect each other and respective endpoints of the fold line 205. The dispenser flaps 163, 165 can be at least partially separated at a curved line of weakening 215 that extends from the intersection of the tear lines 207, 209 to the intersection of the tear lines 211, 213. In some embodiments, one or more of the tear lines 207, 209, 211, 213 can include a relief cut to facilitate relative separation of the dispenser features.

Figure 2:
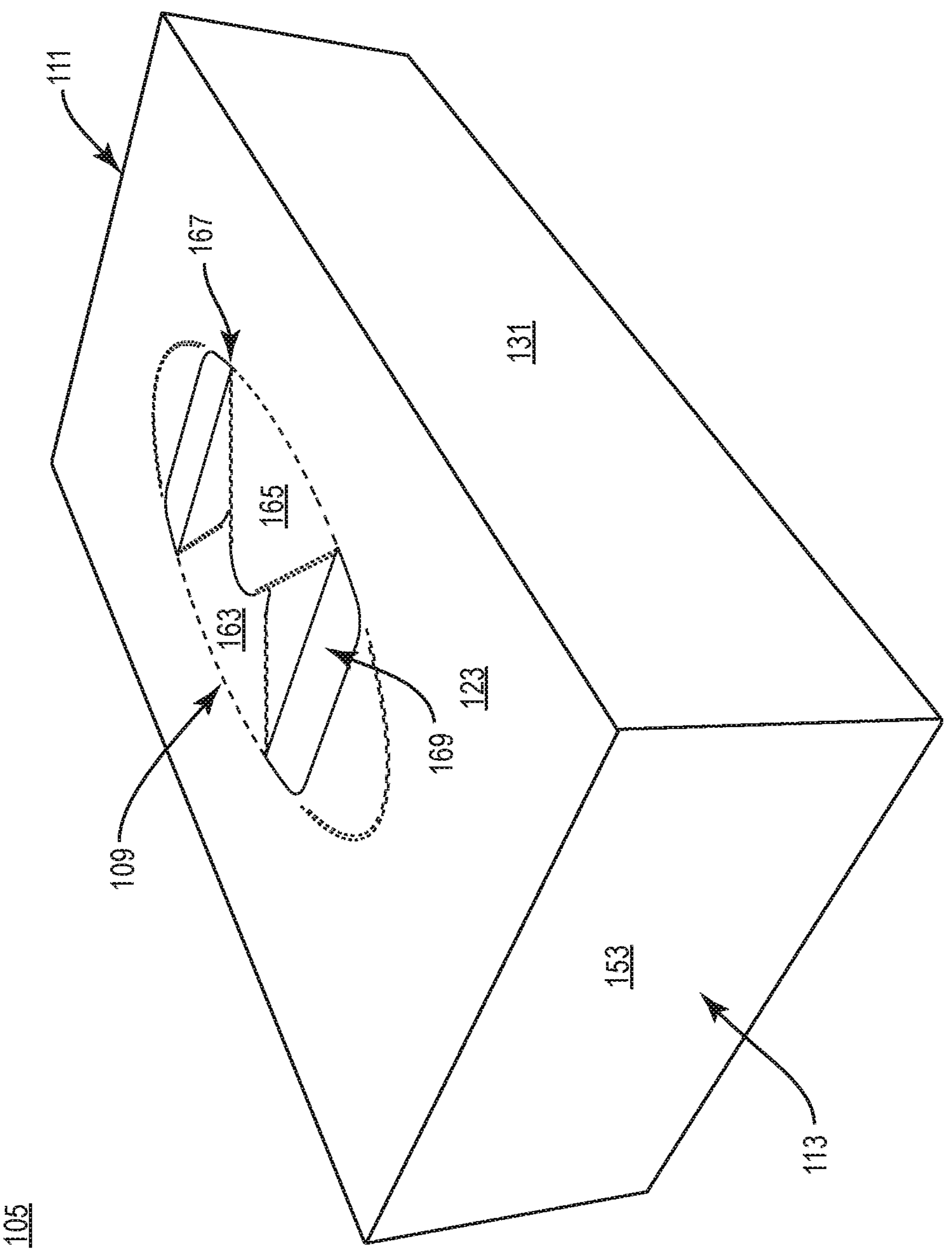
FIG. 2 is a perspective view of a carton formed from the blank of FIG. 1 according to an exemplary embodiment of the disclosure.

Referring additionally to FIG. 2, formation of the carton 105 from the blank 103 will be described according to an exemplary embodiment of the disclosure. The blank 103 can be positioned with the exterior surface thereof in contact with a supporting surface, e.g., in a face-down orientation, and with an interior surface of the blank 103 facing upwardly. The panels 121, 123, 127, 131, 135 can be folded at the fold lines 125, 129, 133, 137 at least partially around the interior 107 of the carton 105 and to position the front panel 121 and the back panels 131, 135 in generally spaced and parallel relation and to position the top panel 123 and the bottom panel 127 in generally spaced and parallel relation. The back panels 131, 135 can be positioned in at least partially overlapping relation and secured to one another with an adhesive, for example glue. In some embodiments, the back panel 131 can be positioned overlapping the back panel 135. In other embodiments, the back panel 135 can be positioned overlapping the back panel 131.

The end flaps 139, 143, 145 can be folded at respective portions of the fold line 141 into at least partially overlapping relation to form the first closed end 111 of the carton 105. The end flap 147 can be folded at the fold line 149 into at least partial overlapping relation with respective portions of the back panels 131, 135. For example, in some embodiments, an exterior surface of the attachment flap 147 can be positioned in at least partial face-to-face contact with an interior surface of the back panel 135.

Similarly, the end flaps 151, 153, 155 can be folded at respective portions of the fold line 157 into at least partially overlapping relation to form the second closed end 113 of the carton 105, with the end flap 159 folded at the fold line 161 into at least partial overlapping relation with respective portions of the back panels 131, 135. For example, in some embodiments, an exterior surface of the attachment flap 159 can be positioned in at least partial face-to-face contact with an interior surface of the back panel 135.

It will be understood that one or more articles G can be loaded into the interior 107 of the carton 105 before both ends 111, 113 of the carton 105 are closed. In the illustrated embodiment, the articles G can be gloves, e.g., nitrile or other polymeric gloves, though the articles can include one or more other household/medical/industrial products without departing from the disclosure.

In the erected configuration of the carton 105, the dispenser 109 can be presented facing upwardly from the top panel 123 to be engaged/operated by a user in a plurality of modalities or configurations.

Figure 3:
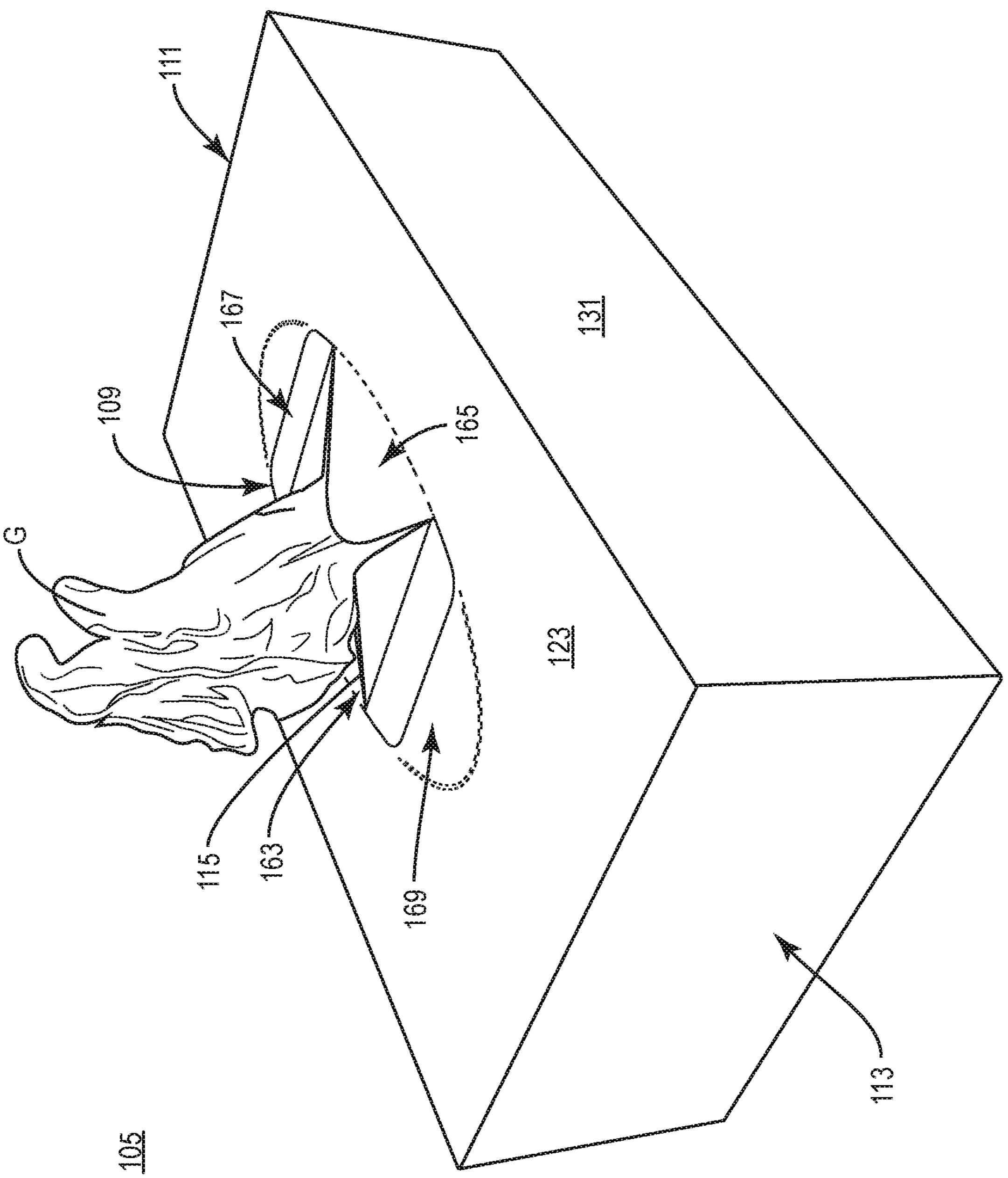
FIG. 3 is a perspective view of the carton of FIG. 2, with the dispenser of the carton in a first configuration.

With additional reference to FIG. 3, in a first configuration of the dispenser 109, the dispenser flaps 163, 165, 167, 169 can be at least partially separated from one another at the respective lines of weakening 207, 209, 211, 213, 215, and the dispenser flaps 167, 169 can be at least partially separated from the top panel 123 at the respective cuts 187, 189, 191, 193. In some embodiments, initial separation of the respective dispenser flaps from one another can be caused by at least partially pressing down thereupon by a user.

In such a configuration, one or more of the dispenser flaps 163, 165, 167, 169 can be moved relative to the top panel 123 to at least partially expose an opening 115 into the interior 107 of the carton 107 to provide access to the articles G in the interior 107 of the carton 105. For example, the end flap 163 can be at least partially folded upwardly relative to the top panel 123 at the tear line 171, the end flap 165 can be at least partially folded upwardly relative to the top panel 123 at the tear line 173, the end flap 167 can be at least partially folded upwardly relative to the top panel 123 and the dispenser panel 175 at the fold line 177, and/or the end flap 169 can be at least partially folded upwardly relative to the top panel 123 and the dispenser panel 179 at the fold line 181. In some embodiments, the distal portion 197 of the end flap 167 can be folded at least partially upwardly relative to the base portion 195 thereof at the fold line 199, and/or the distal portion 203 of the end flap 169 can be at least partially folded upwardly relative to the base portion 201 thereof at the fold line 181.

In this regard, upon at least partial exposure of the opening 115 into the interior 107 of the carton 105 via relative movement of one or more of the dispenser flaps 163, 165, 167, 169, one or more of the articles G can be withdrawn through the opening 115 to the exterior environment for subsequent use.

It will be understood that one or more of the edges and faces of the dispenser flaps 163, 165, 167, 169 can provide at least partial resistance to withdrawing one or more of the articles G from the interior 107 of the carton 105, e.g., via frictional or other interfering engagement with the respective articles G. In one embodiment, the engagement of one or more of the dispenser flaps 163, 165, 167, 169 can at least partially separate adjacent articles Gin the interior 107 of the carton 105 to provide a controlled and serialized dispensing of articles G from the carton 105. In one embodiment, one or more of the dispenser flaps 163, 165, 167, 169 can be at least partially biased downward toward the interior 107 of the carton 105 to facilitate such engagement with the articles G.

When one or more dispensing operations with regard to the carton 105 are complete, it will be understood that one or more of the dispenser flaps 163, 165, 167, 169 can be urged toward the interior 107 of the carton 105, e.g., to minimize the opening 115 into the interior 107 of the carton 105 and to provide a tucked arrangement/profile for the features of the dispenser 109.

Figure 4:
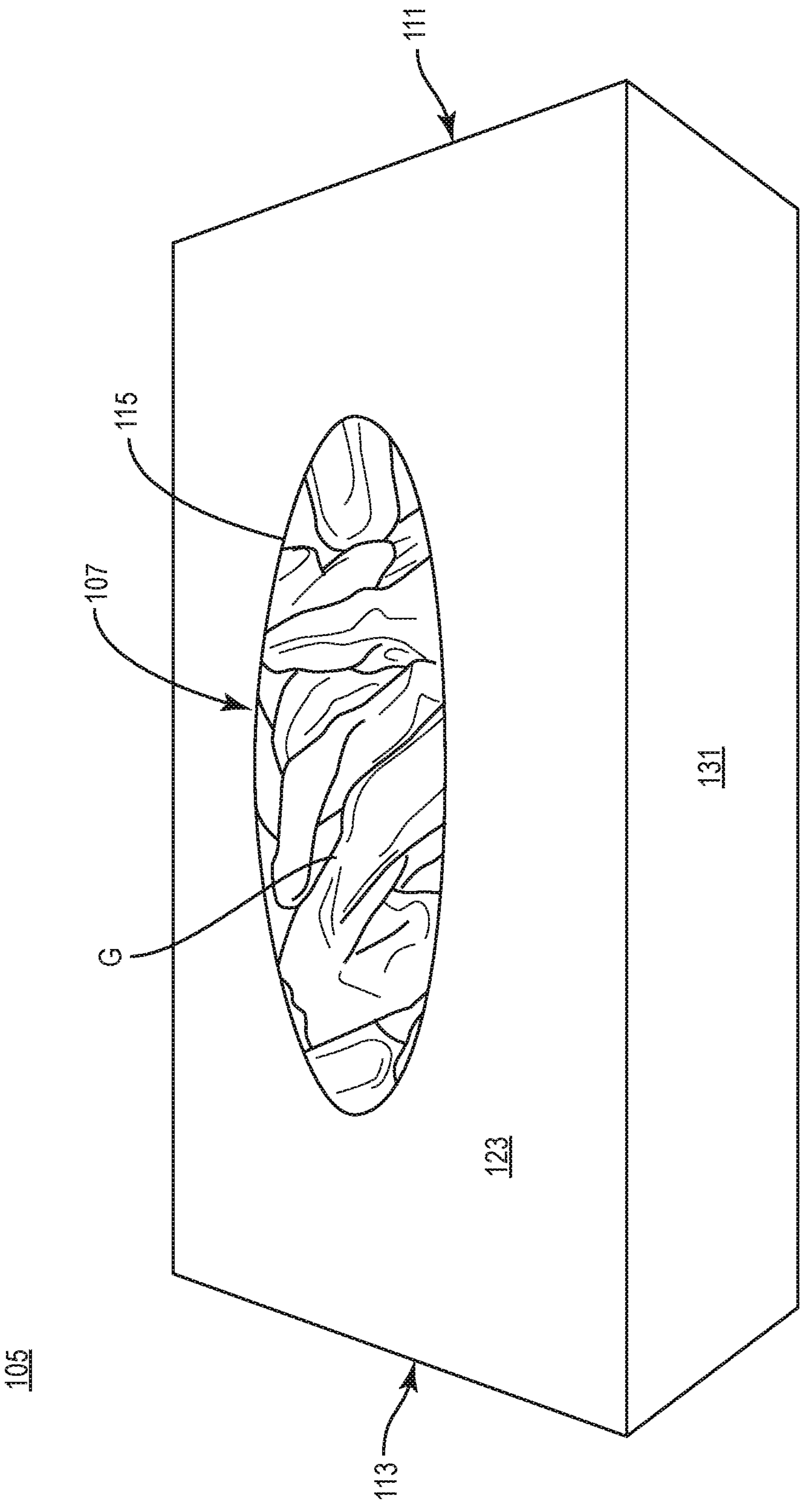
FIG. 4 is a perspective view of the carton of FIG. 2, with the dispenser of the carton in a second configuration.

Referring additionally to FIG. 4 a second configuration of the dispenser 109 is illustrated in which one or more of the dispenser flaps 163, 165, 167, 169 is separated and removed from the top panel 123 at the respective tear lines 171, 173, 183, 185 and respective cuts 187, 189, 191, 193 in order to maximize the size of the opening 115 into the interior 107 of the carton 105. Such access to the articles G in the carton 105 may be desirable, for example, in emergent situations in which rapid access to the articles G is needed. Such a situation could arise for example, in a busy medical or clinical environment in which multiple personnel may need to access the articles G in rapid succession and/or in bulk. In some embodiments, the carton 105 may be provided in an outer container, e.g., a rigid container with a top opening, such that the removal of one or more of the dispenser flaps 163, 165, 167, 169 avoids obscuring the top opening of the outer container.

The second configuration of the dispenser 109 is also advantageous as it provides selectivity to the opening 115 into the carton 105, e.g., by providing the operator the option to remove a desired arrangement or number of dispenser flaps from the top panel 123. For example, an operator may choose to separate less than all of the dispenser flaps 163, 165, 167, 169 from the top panel 123 at the respective tear lines 171, 173, 183, 185 and cuts 187, 189, 191, 193 in order to provide a size and arrangement for the opening 115 of their choosing.

In view of the foregoing, the blank 103/carton 105 provides a carton for dispensing one or more articles in a selectively reconfigurable manner via a dispenser 109 that allows for dispensing of articles according to a first configuration or a second configuration to adapt to changing environments.

The blanks according to the present disclosure can be, for example, formed from coated paperboard and similar materials. For example, the interior and/or exterior sides of the blanks can be coated with a clay coating. The clay coating may then be printed over with product, advertising, price coding, and other information or images. The blanks may then be coated with a varnish to protect any information printed on the blank. The blanks may also be coated with, for example, a moisture barrier layer, on either or both sides of the blanks. In accordance with the above-described embodiments, the blank may be constructed of paperboard of a caliper such that it is heavier and more rigid than ordinary paper. The blanks can also be constructed of other materials, such as cardboard, hard paper, or any other material having properties suitable for enabling the cartons, to function at least generally as described above. The blanks can also be laminated to or coated with one or more sheet-like materials at selected panels or panel sections.

In accordance with the above-described embodiments of the present disclosure, a fold line can be any substantially linear, although not necessarily straight, form of weakening that facilitates folding therealong. More specifically, but not for the purpose of narrowing the scope of the present disclosure, fold lines include: a score line, such as lines formed with a blunt scoring knife, or the like, which creates a crushed portion in the material along the desired line of weakness; a cut that extends partially into a material along the desired line of weakness, and/or a series of cuts that extend partially into and/or completely through the material along the desired line of weakness; and various combinations of these features.

As an example, a tear line can include: a slit that extends partially into the material along the desired line of weakness, and/or a series of spaced apart slits that extend partially into and/or completely through the material along the desired line of weakness, or various combinations of these features. As a more specific example, one type tear line is in the form of a series of spaced apart slits that extend completely through the material, with adjacent slits being spaced apart slightly so that a nick (e.g., a small somewhat bridging-like piece of the material) is defined between the adjacent slits for typically temporarily connecting the material across the tear line. The nicks are broken during tearing along the tear line. The nicks typically are a relatively small percentage of the tear line, and alternatively the nicks can be omitted from or torn in a tear line such that the tear line is a continuous cut line. That is, it is within the scope of the present disclosure for each of the spaced apart slits to be replaced with a continuous slit, a continuous score, or the like. For example, a cut line can be a continuous slit or could be wider than a slit without departing from the present disclosure. Also, a tear line can be a series of cut scores passing completely, or partially, through the material, that are separated by nicks.

The term "glue" is intended to encompass all manner of adhesives commonly used to secure carton panels in place.

The foregoing description of the disclosure illustrates and describes various exemplary embodiments. Various additions, modifications, changes, etc., could be made to the exemplary embodiments without departing from the spirit and scope of the disclosure. It is intended that all matter contained in the above description or shown in the accompanying drawings shall be interpreted as illustrative and not in a limiting sense. Additionally, the disclosure shows and describes only selected embodiments of the disclosure, but the disclosure is capable of use in various other combinations, modifications, and environments and is capable of changes or modifications within the scope of the inventive concept as expressed herein, commensurate with the above teachings, and/or within the skill or knowledge of the relevant art. Furthermore, certain features and characteristics of each embodiment may be selectively interchanged and applied to other illustrated and non-illustrated embodiments of the disclosure.

What is claimed is:

1. A carton for holding and dispensing at least one article, the carton comprising:

a plurality of panels extending at least partially around an interior of the carton and comprising a top panel, a bottom panel, a front panel, and at least one back panel;

a plurality of end flaps foldably connected to a respective panel of the plurality of panels and forming at least one closed end of the carton; and a dispenser for accessing the interior of the carton, the dispenser comprising a plurality of dispenser flaps at least partially separably connected to the top panel such that the dispenser is reconfigurable between a first configuration in which the plurality of dispenser flaps are foldably connected to the top panel and arranged to define a first opening that communicates with the interior, and a second configuration in which one or more of the dispenser flaps are removed from the top panel to define a second opening that communicates with the interior, wherein the first opening is smaller than the second opening, the plurality of dispenser flaps comprises a first dispenser flap and a second dispenser flap at least partially separably connected to the first dispenser flap, the first dispenser flap is at least partially separably connected to the top panel at a curved line of weakening and the second dispenser flap is at least partially separably connected to the first dispenser flap at an oblique tear line, the plurality of dispenser flaps comprises paperboard.

2. The carton of claim 1, wherein the carton is devoid of polymeric film.

3. The carton of claim 1, wherein the dispenser further comprises at least one dispenser panel foldably connected to the second dispenser flap and at least partially separably connected to the top panel at a curved tear line.

4. The carton of claim 3, wherein the second dispenser flap comprises a base portion foldably connected to a distal portion, the distal portion of the second dispenser flap at least partially separably connected to the first dispenser flap at the oblique tear line, the base portion of the second dispenser flap at least partially separable from the top panel at at least one cut, the base portion of the second dispenser flap foldably connected to the at least one dispenser panel.

5. The carton of claim 4, wherein the dispenser further comprises a third dispenser flap at least partially separably connected to the second dispenser flap at an oblique tear line and at least partially separably connected to the top panel at a curved tear line.

6. The carton of claim 5, wherein the third dispenser flap is at least partially separably connected to the first dispenser flap at a curved cut.

7. The carton of claim 6, wherein the dispenser further comprises a fourth dispenser flap at least partially separably connected to the third dispenser flap at an oblique tear line, the fourth dispenser flap at least partially separably connected to the first dispenser flap at an oblique tear line.

8. The carton of claim 7, wherein the at least one dispenser panel is a first dispenser panel and the dispenser further comprises a second dispenser panel foldably connected to the fourth dispenser flap and at least partially separably connected to the top panel at a curved tear line.

9. The carton of claim 8, wherein the fourth dispenser flap comprises a base portion foldably connected to a distal portion, the distal portion of the fourth dispenser flap at least partially separably connected to the first dispenser flap at the respective oblique tear line, the distal portion of the fourth dispenser flap at least partially separably connected to the third dispenser flap at the respective oblique tear line, the base portion of the fourth dispenser flap at least partially separable from the top panel at at least one cut, the base portion of the fourth dispenser flap foldably connected to the second dispenser panel.

10. The carton of claim 9, wherein the at least one closed end of the carton is a first closed end of the carton, and the plurality of end flaps are overlapped to form a second closed end of the carton.

11. A blank for forming a carton for holding and dispensing at least one article, the blank comprising:

a plurality of panels for extending at least partially around an interior of the carton formed from the blank and comprising a top panel, a bottom panel, a front panel, and at least one back panel;

a plurality of end flaps foldably connected to a respective panel of the plurality of panels for forming at least one closed end of the carton formed from the blank; and a dispenser for accessing the interior of the carton formed from the blank, the dispenser comprising a plurality of dispenser flaps at least partially separably connected to the top panel such that the dispenser is reconfigurable between a first configuration in which the plurality of dispenser flaps are foldably connected to the top panel and arranged to define a first opening that communicates with the interior, and a second configuration, in which one or more of the dispenser flaps are removed from the top panel to define a second opening that communicates with the interior, wherein the first opening is smaller than the second opening, the plurality of dispenser flaps comprises a first dispenser flap and a second dispenser flap at least partially separably connected to the first dispenser flap, the first dispenser flap is at least partially separably connected to the top panel at a curved line of weakening and the second dispenser flap is at least partially separably connected to the first dispenser flap at an oblique tear line, wherein the plurality of dispenser flaps comprises paperboard.

12. The blank of claim 11, wherein the blank is devoid of polymeric film.

13. The blank of claim 11, wherein the dispenser further comprises at least one dispenser panel foldably connected to the second dispenser flap and at least partially separably connected to the top panel at a curved tear line.

14. The blank of claim 13, wherein the second dispenser flap comprises a base portion foldably connected to a distal portion, the distal portion of the second dispenser flap at least partially separably connected to the first dispenser flap at the oblique tear line, the base portion of the second dispenser flap at least partially separable from the top panel at at least one cut, the base portion of the second dispenser flap foldably connected to the at least one dispenser panel.

15. The blank of claim 14, wherein the dispenser further comprises a third dispenser flap at least partially separably connected to the second dispenser flap at an oblique tear line and at least partially separably connected to the top panel at a curved tear line.

16. The blank of claim 15, wherein the third dispenser flap is at least partially separably connected to the first dispenser flap at a curved cut.

17. The blank of claim 16, wherein the dispenser further comprises a fourth dispenser flap at least partially separably connected to the third dispenser flap at an oblique tear line, the fourth dispenser flap at least partially separably connected to the first dispenser flap at an oblique tear line.

18. The blank of claim 17, wherein the at least one dispenser panel is a first dispenser panel and the dispenser further comprises a second dispenser panel foldably connected to the fourth dispenser flap and at least partially separably connected to the top panel at a curved tear line.

19. The blank of claim 18, wherein the fourth dispenser flap comprises a base portion foldably connected to a distal portion, the distal portion of the fourth dispenser flap at least partially separably connected to the first dispenser flap at the respective oblique tear line, the distal portion of the fourth dispenser flap at least partially separably connected to the third dispenser flap at the respective oblique tear line, the base portion of the fourth dispenser flap at least partially separable from the top panel at at least one cut, the base portion of the fourth dispenser flap foldably connected to the second dispenser panel.

20. The blank of claim 19, wherein the at least one closed end of the carton formed from the blank is a first closed end of the carton formed from the blank, and the plurality of end flaps are for being overlapped to form a second closed end of the carton formed from the blank.

21. A method of forming a carton for holding and dispensing at least one article, the method comprising:

obtaining a blank, the blank comprising a plurality of panels comprising a top panel, a bottom panel, a front panel, and at least one back panel, the blank further comprising a plurality of end flaps foldably connected to a respective panel of the plurality of panels, the blank further comprising a dispenser comprising a plurality of dispenser flaps at least partially separably connected to the top panel;

positioning the plurality of panels extending at least partially around an interior of the carton and such that the dispenser is reconfigurable between a first configuration in which the plurality of dispenser flaps are foldably connected to the top panel and arranged to define a first opening that communicates with the interior, and a second configuration in which one or more of the dispenser flaps are removed from the top panel to define a second opening that communicates with the interior, wherein the first opening is smaller than the second opening; and overlapping the plurality of end flaps to form at least one closed end of the carton, the plurality of dispenser flaps comprises a first dispenser flap and a second dispenser flap at least partially separably connected to the first dispenser flap, the first dispenser flap is at least partially separably connected to the top panel at a curved line of weakening and the second dispenser flap is at least partially separably connected to the first dispenser flap at an oblique tear line, wherein the plurality of dispenser flaps comprises paperboard.

22. The method of claim 21, wherein the carton is devoid of polymeric film.

23. The method of claim 21, wherein the dispenser further comprises at least one dispenser panel foldably connected to the second dispenser flap and at least partially separably connected to the top panel at a curved tear line.

24. The method of claim 23, wherein the second dispenser flap comprises a base portion foldably connected to a distal portion, the distal portion of the second dispenser flap at least partially separably connected to the first dispenser flap at the oblique tear line, the base portion of the second dispenser flap at least partially separable from the top panel at at least one cut, the base portion of the second dispenser flap foldably connected to the at least one dispenser panel.

25. The method of claim 24, wherein the dispenser further comprises a third dispenser flap at least partially separably connected to the second dispenser flap at an oblique tear line and at least partially separably connected to the top panel at a curved tear line.

26. The method of claim 25, wherein the third dispenser flap is at least partially separably connected to the first dispenser flap at a curved cut.

27. The method of claim 26, wherein the dispenser further comprises a fourth dispenser flap at least partially separably connected to the third dispenser flap at an oblique tear line, the fourth dispenser flap at least partially separably connected to the first dispenser flap at an oblique tear line.

28. The method of claim 27, wherein the at least one dispenser panel is a first dispenser panel and the dispenser further comprises a second dispenser panel foldably connected to the fourth dispenser flap and at least partially separably connected to the top panel at a curved tear line.

29. The method of claim 28, wherein the fourth dispenser flap comprises a base portion foldably connected to a distal portion, the distal portion of the fourth dispenser flap at least partially separably connected to the first dispenser flap at the respective oblique tear line, the distal portion of the fourth dispenser flap at least partially separably connected to the third dispenser flap at the respective oblique tear line, the base portion of the fourth dispenser flap at least partially separable from the top panel at at least one cut, the base portion of the fourth dispenser flap foldably connected to the second dispenser panel.

30. The method of claim 29, wherein the at least one closed end of the carton is a first closed end of the carton, and method further comprises overlapping the plurality of end flaps to form a second closed end of the carton.

31. A carton for holding and dispensing at least one article, the carton comprising:

a plurality of panels extending at least partially around an interior of the carton and comprising a top panel, a bottom panel, a front panel, and at least one back panel;

a plurality of end flaps foldably connected to a respective panel of the plurality of panels and forming at least one closed end of the carton; and a dispenser for accessing the interior of the carton, the dispenser comprising a plurality of dispenser flaps at least partially separably connected to the top panel such that the dispenser is reconfigurable between a first configuration, in which the plurality of dispenser flaps is foldably connected to the top panel, and a second configuration, in which one or more of the dispenser flaps is separated from the top panel, the plurality of dispenser flaps comprises a first dispenser flap at least partially separably connected to the top panel at a curved line of weakening and a second dispenser flap at least partially separably connected to the first dispenser flap at an oblique tear line.

32. The carton of claim 31, wherein the plurality of dispenser flaps comprises a third dispenser flap at least partially separably connected to the second dispenser flap at an oblique tear line and at least partially separably connected to the top panel at a curved tear line, the third dispenser flap is at least partially separably connected to the first dispenser flap at a curved cut.

33. The carton of claim 32, wherein the dispenser further comprises a fourth dispenser flap at least partially separably connected to the third dispenser flap at an oblique tear line, the fourth dispenser flap at least partially separably connected to the first dispenser flap at an oblique tear line.

34. A blank for forming a carton for holding and dispensing at least one article, the blank comprising:

a plurality of panels for extending at least partially around an interior of the carton formed from the blank and comprising a top panel, a bottom panel, a front panel, and at least one back panel;

a plurality of end flaps foldably connected to a respective panel of the plurality of panels for forming at least one closed end of the carton formed from the blank; and a dispenser for accessing the interior of the carton formed from the blank, the dispenser comprising a plurality of dispenser flaps at least partially separably connected to the top panel such that the dispenser is reconfigurable between a first configuration, in which the plurality of dispenser flaps is foldably connected to the top panel, and a second configuration, in which one or more of the dispenser flaps is separated from the top panel, the plurality of dispenser flaps comprises a first dispenser flap at least partially separably connected to the top panel at a curved line of weakening and a second dispenser flap at least partially separably connected to the first dispenser flap at an oblique tear line.

35. The blank of claim 34, wherein the plurality of dispenser flaps comprises a third dispenser flap at least partially separably connected to the second dispenser flap at an oblique tear line and at least partially separably connected to the top panel at a curved tear line, the third dispenser flap is at least partially separably connected to the first dispenser flap at a curved cut.

36. The blank of claim 35, wherein the plurality of dispenser flaps comprises a fourth dispenser flap at least partially separably connected to the third dispenser flap at an oblique tear line, the fourth dispenser flap at least partially separably connected to the first dispenser flap at an oblique tear line.

* * * * *